United States Patent [19]

Crutcher

[11] 4,159,791
[45] Jul. 3, 1979

[54] MEASURING AND DISPENSING DEVICE

[76] Inventor: William C. Crutcher, 178 North St., Middlebury, Conn. 06762

[21] Appl. No.: 784,244

[22] Filed: Apr. 4, 1977

[51] Int. Cl.² .............................................. G01F 11/26
[52] U.S. Cl. .................................... 222/454; 141/322
[58] Field of Search .............. 222/454, 457, 366, 542; 221/288; 248/221.3, 221.4; 141/322, 22, 320, 381

[56] References Cited

U.S. PATENT DOCUMENTS

| | | | |
|---|---|---|---|
| 1,912,438 | 6/1933 | Etter | 141/322 |
| 2,211,120 | 8/1940 | Holland | 141/322 |
| 2,322,885 | 6/1943 | Rogers | 222/542 X |
| 2,649,226 | 8/1953 | Lay | 222/542 X |
| 3,197,086 | 7/1965 | Raddysh | 141/322 X |
| 3,627,249 | 12/1971 | Lipinski | 248/221.4 |
| 3,751,575 | 8/1973 | Barb | 248/221.4 X |

FOREIGN PATENT DOCUMENTS

| | | | |
|---|---|---|---|
| 649345 | 9/1962 | Canada | 222/454 |
| 2455867 | 6/1975 | Fed. Rep. of Germany | 248/221.3 |

Primary Examiner—Robert J. Spar
Assistant Examiner—Charles A. Marmor

[57] ABSTRACT

A jar top measuring and dispensing device for granulated material such as instant coffee and the like. A cup member is suspended by one or more legs from a sealing member which is retained in the jar top. A measured portion of the contents of the jar may then be caught in the cup member when the container is inverted and then righted. The measured portion is then dispensed when the top is removed from the jar and tilted over a receptacle.

6 Claims, 15 Drawing Figures

MEASURING AND DISPENSING DEVICE

BACKGROUND OF THE INVENTION

This invention relates generally to measuring and dispensing devices for particulated material or powdered material kept in a jar-type container. More particularly, the invention relates to improved constructions of measuring and dispensing devices adapted to cooperate with the closure members or tops of the containers.

There are many types of convenience foods or beverages which come in granulated or powdered form and which are intended to be mixed in measured quantities with liquid in a receptacle. Examples are instant coffee, tea, and soups. Other types of granulated or powdered materials also come in jars and need to be kept in sealed condition and then dispensed in measured quantities, such as sugar, cheese and the like.

Various types of dispensing devices for granulated material are well known in the art. There are granule dispensing devices which measure and dispense each time the container is tipped. Generally these dispensers have a well in the neck of the container which is filled with a quantity of granules when the container is tipped. Then when the container is again tipped, the granules pour out another opening into a receptacle. These dispensing devices have various types of intricate passages and walls formed in the top or in members attached to the top. The top remains attached to the container in use and the contents are usually open to the air, or unsealed.

Examples of the foregoing types of measuring and tilting dispensing devices are found in U.S. Pat. No. 2,903,163 issued Sept. 8, 1959 to C. H. Newman; U.S. Pat. No. 3,836,055 issued Sept. 17, 1974 to P. C. Katzmark; and U.S. Pat. No. 3,716,173 issued Feb. 13, 1973 to G. H. Yasso, these patents merely being exemplary of many.

Measuring devices for medicines are known which function when the bottle is tipped. U.S. Pat. No. 2,760,693 issued Aug. 28, 1956 to S. E. Mika shows a construction where the lip of a cup-type insert is held between the top and rim of the bottle, filled with liquid through a side opening valve when the bottle is tipped, and then separately removed and used as a medicine cup after the top is removed.

Another type of separate insert member is shown in U.S. Pat. No. 3,473,701 issued Oct. 21, 1969 to M. J. Bates, where a perforated strainer or basket is used to catch olives and drain the juice therefrom before removing the jar top and giving access to the olives. With this device, the individual olives are then removed from the insert basket which remains hanging within the jar container.

Dispensing devices of the tip and pour type, such as sugar dispensers are known where a cup member with flexible metal legs is adapted to snap onto the pouring funnel. However as mentioned previously, the lid is intended to stay on the container with this type of dispenser.

It would be very desirable to have a measuring and dispensing device for instant coffee and the like, which would permit the use of a thin freshness or vacuum seal across the rim of the jar before the dispensing device is installed, and yet which does not require furnishing a separate package for the dispensing device if it is sold along with the container. It would also be desirable to have a very simple and inexpensive dispensing device which can be furnished with each container of granulated material and discarded if not needed. Utilization of the device should not interfere with sealing of the contents of the container or use or removal of the contents in other ways if desired.

Accordingly, one object of the present invention is to provide an improved measuring and dispensing device for removing a measured quantity of particulate material from a container and transfering it to a receptacle.

Another object of the invention is to provide an improvement in such a device for adapting it to be suspended from the container top.

Another object of the invention is to provide an improvement in such a device facilitating economical manufacture and simple installation.

Another object of the invention is an improved dispensing device which may be separately packed in the container and attached after breaking the freshness seal and removing the device from the container.

Other objects and advantages of the invention will become apparent from the following description, taken in connection with the accompanying drawings.

DRAWING

FIG. 1 is a plan view of the underside of a container top with the measuring and dispensing device assembled, FIG. 2 is an elevation view, in cross-section, taken along lines II—II of FIG. 1, FIG. 3 is a plan view of a sealing member used in the assembly of FIG. 1, FIG. 4 is a perspective view of a cup member used in the assembly of FIG. 1;

FIGS. 5a through 5c are elevation views, in cross section, of the container, illustrating the operation, FIGS. 6 and 7 are elevation views, in section, of the container and a modified dispensing device, after assembly and before unpackaging the container, respectively, FIG. 8 is a plan view of the underside of a container top with the modified measuring and dispensing device, FIG. 9 is an elevation view in cross-section, taken along lines IX—IX of FIG. 8, FIG. 10 is a plan view of a modified sealing member used in the embodiment of FIG. 8, FIG. 11 is an elevation view of the modified FIG. 8 cup, FIGS. 12 and 13 are cross-sections of two other modifications of cup members and methods of attachment to the sealing members.

SUMMARY OF THE INVENTION

Briefly stated, the invention comprises a measuring and dispensing device for a container with a removable top, having a sealing member adapted to be held in the container top and provided with means adapted to cooperate with at least one support leg of a cup member for attachment of the cup member to the sealing member to hold the cup suspended and facing the top inside the container. The cup is so proportioned and so spaced from the top that a measured portion of the contents are caught when the container is inverted and righted, and adapted to dispense the measured portion when the top is removed and tilted over a receptacle.

DETAILED DESCRIPTION OF THE INVENTION

Figure 1:
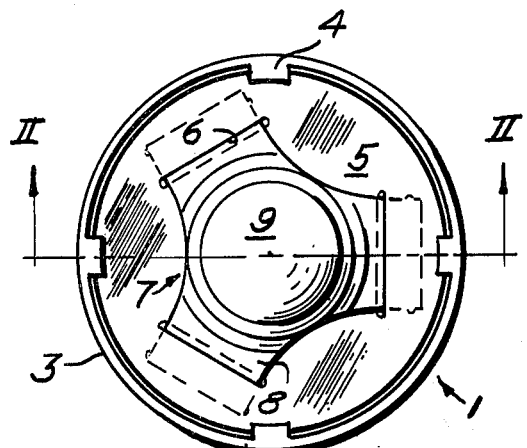
Figure 2:
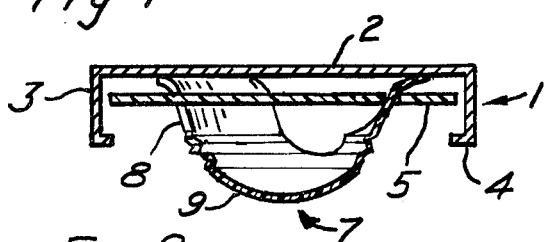

Referring now to FIG. 1 of the drawing, the assembled measuring and dispensing device is shown in plan view from the underside of the container top, while FIG. 2 shows the assembly in cross-section. The container top 1 has a flat circular portion 2, cylindrical side walls 3, with turned in tabs 4 adapted to cooperate with means on the container rim to tighten the top by pulling it toward the rim in a known manner.

A sealing member 5 may consist of a disk of waxed cardboard, plastic or heavy paper of sufficient diameter to prevent it from easily being removed because of tabs 4. The sealing member 5 may be quite similar to those presently used as sealing members in removable tops, except that here, one or more apertures are provided in the form of slots 6. These serve for attachment of a cup member 7 by means of one or more attachment legs 8. Legs 8 are integral with and extend substantially in tripod fashion from a central cup portion 9. Legs 8 are flexible and extend through the slots 6 to hold the cup portion in the position shown in FIG. 2, so that it is suspended from the sealing member 5 and spaced therefrom.

Figure 3:
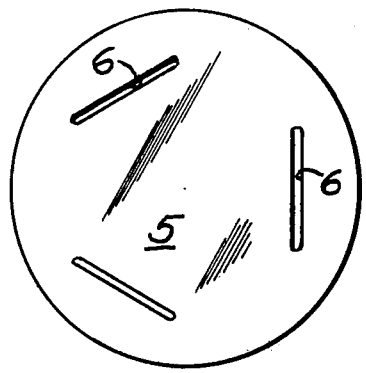

Reference to FIG. 3 shows that the slots 6 are arranged at a uniform angular spacing and oriented perpendicular to radial lines from the center of the disk.

Figure 4:
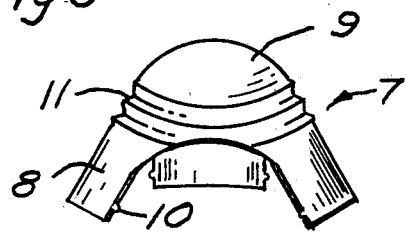

FIG. 4 shows the cup member in one preferred form to include small pips 10 on either side of the legs 8 and dimensioned to extend apart slightly more than the length of a slot 6 in the sealing member 5. The cup member 7 is preferably constructed of lightweight flexible plastic material such as polystyrene or the like used in disposable drinking cups. In this manner, very thin and inexpensive cup members 7 can be fashioned. In order to make it easier to insert the legs 8 in slots 6, circular corrugations 11 are useful to assist in flexing the legs. The corrugations 11 serve to make the cup portion 9 more rigid however which is also desirable.

Figure 5A:
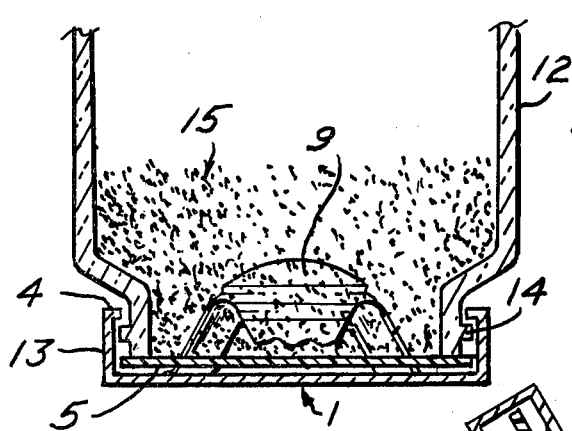
Figure 5B:
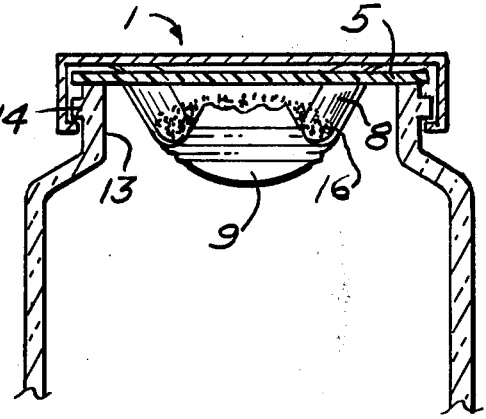
Figure 5C:
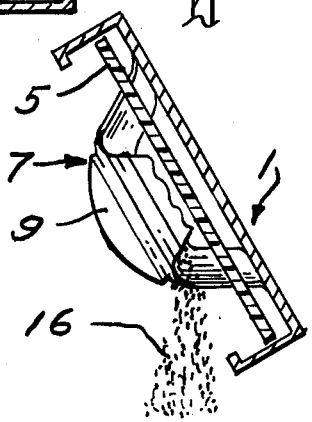

FIGS. 5a through 5c illustrate the sequence of operation. A container 12 shown in FIGS. 5a and 5b has a cylindrical neck with a rim 13. The neck has external ridges or threads 14 adapted to cooperate with the tabs 4 on top 1. Thus the top is tightened toward the rim. The peripheral edge of the sealing member is disposed between the rim 13 and the top 1 so as to form a seal when the top is attached. This is so despite the presence of the apertures in the central portion of the sealing member, because the seal is formed at the periphery.

In FIG. 5a, the container is inverted, with top 1 attached, and the particulate, powdered or granulated contents, illustrated by reference numeral 15 surrounds and fills the cup member 7 by flowing between the legs 8. This action may be facilitated by slightly shaking the container 12 when inverted.

In FIG. 5b, the container 12 is righted and a measured portion of material 16 is caught in the cup portion 9 of cup member 7. The cup portion is sized according to the type of contents and the preselected standard measure to be dispensed. It will be found that the corrugations aid in retaining the measured portion 16 during removal of the top.

FIG. 5c shows the dispensing step. The top, with the attached dispensing device is tilted, and the measured material is poured from the cup portion into a receptacle. For example, if the material is instant coffee, it can simply be poured into the receptacle and mixed by stirring action of hot water added later.

The embodiment of FIGS. 1-4 is particularly useful for a disposable dispenser, since the cup member can be made very thin and lightweight and packed in the container along with the contents. The slots 6 may be easily added to conventional sealing members. The flexible legs bend when they are inserted and tend to hold the sealing member with a spring action. This is very useful, since it allows the dispenser to retract into the top when the top is attached, but biases the cup into an extended position when pouring as shown in FIG. 5c.

Figure 8:
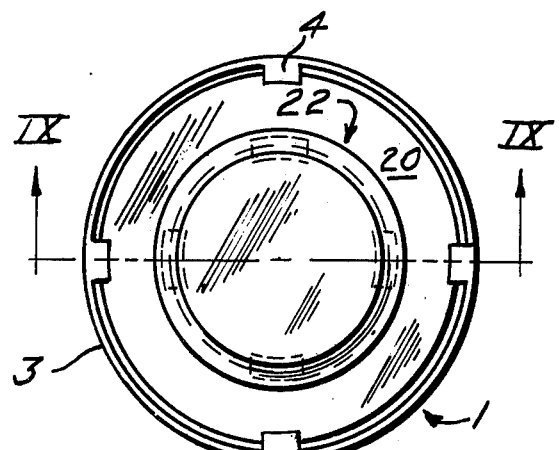
Figure 10:
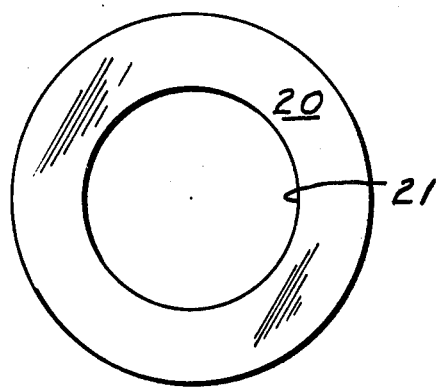
Figure 9:
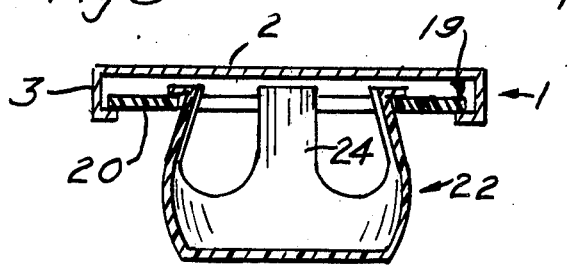

Referring now to FIGS. 8 through 11, a modified form of the invention is illustrated. The top 1 is formed as in FIG. 1 previously discussed. FIG. 8 shows the assembled device in plan view, while FIG. 9 shows the elevation view in section. A sealing member 20 in top 1 is adapted for attachment of a cup member 22. The sealing member 20, as seen more clearly by itself in FIG. 10, is a flat ring with a single central opening or aperture 21. The peripheral edge of sealing member 20 is of such a diameter that it is retained in the top by tabs 4 and of material adapted to form a seal between the rim of the container and top 1. Other means for retaining the sealing member 20 in top 1 may include adhesive on the upper outer edge of member 20 in the location indicated at 19 in FIG. 9. This method is useful where fairly shallow screw threads instead of the deeper tabs 4 shown in the drawings.

Figure 11:
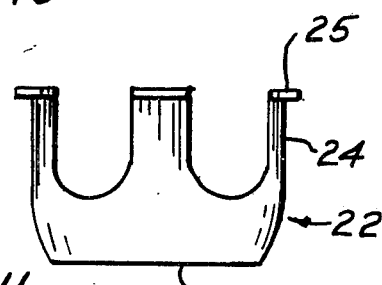

FIG. 11 shows the unattached cup member 22 with a cup portion 23 and upwardly extending legs 24 with terminal outwardly extending tabs 25. The wall thickness intended with the construction of this embodiment is slightly heavier than before, but the legs 24 are flexible so that they may be bent inwardly as shown in FIG. 9. Thus to attach the cup member, the legs 24 are compressed and inserted into the aperture 21 in the sealing member. When released, the tabs 25 hold the cup member 22 in the aperture.

Figure 6:
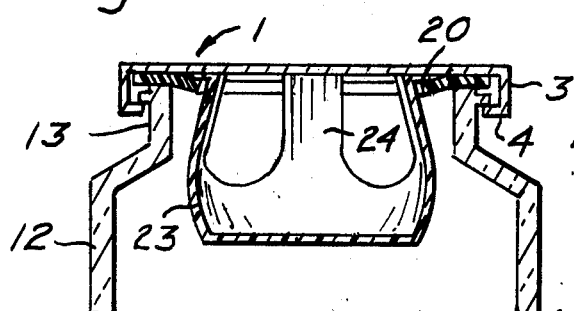

In FIG. 6, the top 1 is shown attached to the container 12 having substantially the same construction as previously described. The method of filling the measuring and dispensing device, righting the container, removing the top with the attached cup and dispensing the contents is the same as previously described.

Figure 7:
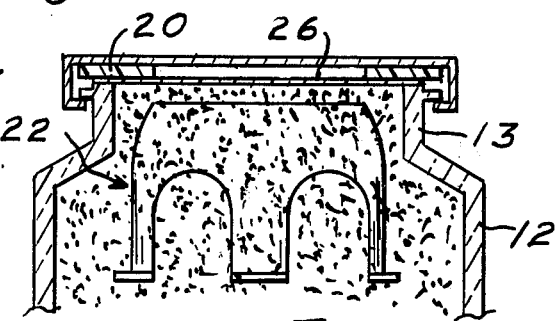

If desired, the sealing member can be furnished together with a cup member and sealed container, to be assembled after breaking open of a separate fresness seal which is often used to insure integrity of the contents during storage prior to purchase. By providing constructions wherein the cup member is adapted for separate attachment to the sealing member, the cup member can be separately packed along with the contents of the container inside the freshness seal. The sealing member is carried in the top outside of the freshness seal. This is shown in FIG. 7, and can, of course be used in similar manner with the embodiment of FIG. 1, although this is not illustrated. The freshness seal is illustrated at 26 and the cup member 22 is inverted and packed along with the contents before applying the seal. In this way it occupies very little volume and after the container is opened, it is attached to the sealing member 20 as previously described.

Figure 12:
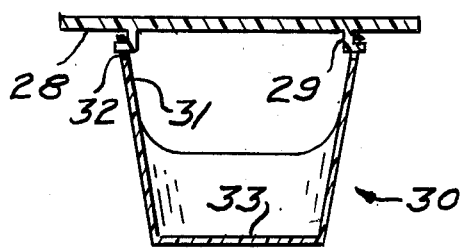

While the preferred embodiment of the invention uses at least one aperture in the sealing member as the means for attachment of the support legs of the cup member to the sealing member by insertion of the legs into the apertures, the arragement can be reversed as shown in FIG. 12. There only the sealing member 28 and cup member 30 are shown, the remainder of the parts of the top and container being as shown before. The sealing member includes circumferentially spaced, outwardly turned tabs 29. In turn, the support legs 31 are provided with apertures 32 in their ends. The legs 31, which extend away from the open ends of the cup portion, designated as 33, similar to the previous arrangements, are slightly flexible so that they can be flexed outward for attaching the cup member 30 by slipping the apertures 32 over the ends of the tabs 29 and then releasing the legs.

While the arrangement of FIG. 12 is useful in some cases, the use of an aperture in the sealing member, rather than a protruding tab requires less of a departure from the known types of seals, does not substantially interfere with the freshness seal, and is easily implemented in practice.

Figure 13:
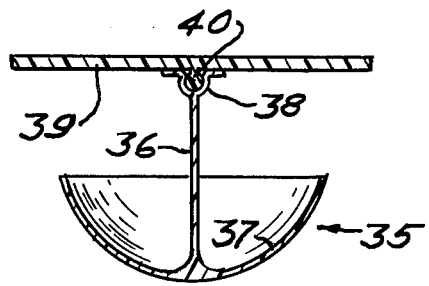

Another modification, shown in FIG. 13, uses a cup member 35 with only a single central support leg 36 extending away from the open end of the cup portion 37 and terminating in a small flexible socket 38. The sealing member 39, which is a flat disk with peripheral edges adapted to form a seal between the rim of the container and its top, has an upstanding tab in its center. After the cup is unpacked from the container, the socket 38 may be snapped over the tab 40 to hold the cup suspended and spaced from the top inside the container.

The invention described above is useful with a wide variety of types of containers and tops, both plastic and metal. The sealing members described can be a supplement to another sealing layer formed in place on the top, or can serve as the sole sealing member. The length and width of the attachment legs is best found by adjustment to the type of material to be measured as no special dimensions are considered critical. The width of the legs is sufficient to assist in keeping the material in place during removal of the top and transfer of the material. The legs should not be so great in number as to prevent material from entering and filling the cup, nor should they be to wide for the same reason. In fact only one central leg may be utilized with the cup portion surrounding it, however it has been found that at least three legs give the best stability.

The sealing members may be either stiff or slightly flexible so that they can be forced in place in the top. Other modifications will occur to those skilled in the art, and it is desired to secure in the appended claims all such modifications as fall within the true spirit and scope of the invention.

What I claim as new is:

1. A measuring and dispensing device for the contents of a container having a cylindrical neck with a rim, said container provided with a removable top having means cooperating with the container neck for tightening the top against the rim, said measuring and dispensing device comprising:

a cup member having a cup portion sized to hold a preselected measure of the contents of the container and also having a plurality of spaced flexible support legs extending away from the open end of the cup portion, and a substantially flat sealing member having a peripheral edge adapted to form a seal between the rim of the container and the top and also adapted to retain the sealing member in said top, said sealing member being provided with at least one aperture inside said peripheral edge arranged to receive the ends of said support legs, said flexible legs being adapted to be flexed and inserted for attachment of the cup member to the sealing member to hold the cup portion suspended and spaced from the top inside the upper part of the container, whereby a measured portion of the container contents may be caught in the cup portion when the container is inverted and then righted, and the measured portion then dispensed when the top is removed from the container and tilted over a receptacle.

2. The combination according to claim 1, wherein there are a plurality of circumferentially spaced apertures in the sealing member and an equal number of diverging support legs circumferentially spaced around the cup portion of the cup member.

3. The combination according to claim 2, wherein said apertures are slots oriented perpendicular to radial lines from the center of the sealing member and wherein said support legs are dimensioned on the ends thereof to permit insertion into the slots and to resist withdrawal from the slots.

4. The combination according to claim 1, wherein there is a central circular aperture in the center of the sealing member and wherein there are circumferentially spaced support legs on the cup member having radially extending tabs, whereby inward compression of the legs and release within the aperture causes the tabs to prevent release of the cup member from the sealing member.

5. The combination according to claim 1, wherein the circumferential edge of the sealing member retains the sealing member in the top by interference fit with said cooperating means of said removable container top serving to tighten it against the rim.

6. The combination according to claim 1, wherein the circumferential edge of the sealing member is retained in the top by adhesive between the sealing member circumferential edge and the top.

* * * * *